United States Patent [19]
Clarke

[11] Patent Number: 5,627,417
[45] Date of Patent: May 6, 1997

[54] COMPRESSOR MINIMUM OFF-TIME SWITCH FOR SERIES CONNECTION WITH DELAY-ON-BREAK FEATURE

[75] Inventor: Roger Clarke, Corydon, Ky.

[73] Assignee: Diversified Electronics, Inc., Evansville, Ind.

[21] Appl. No.: 145,511

[22] Filed: Nov. 4, 1993

[51] Int. Cl.$^6$ ............................................. H01H 7/00
[52] U.S. Cl. .................................. 307/141; 307/141.4
[58] Field of Search ............................. 307/139, 141, 307/141.4, 140, 112, 116, 125; 318/798, 799, 801, 802, 807, 811

[56] References Cited

U.S. PATENT DOCUMENTS

| | | | |
|---|---|---|---|
| 3,815,668 | 6/1974 | Carlson | 307/39 |
| 4,020,358 | 4/1977 | Wyland | 307/39 |
| 4,045,973 | 9/1977 | Anderson et al. | 318/778 |
| 4,128,854 | 12/1978 | Ruminsky | 361/22 |
| 4,319,711 | 3/1982 | Baker et al. | 236/46 R |
| 5,455,469 | 10/1995 | Ward | 307/141.4 |

OTHER PUBLICATIONS

Diversified Electronics, "Short Cycle Time Delays", Catalog Sheet, 1985, p. 3.
Diversified Electronics, Compressor Protectors Catalog, Mar., 1991, pp. 1–5.

*Primary Examiner*—David S. Martin
*Assistant Examiner*—Jonathan S. Kaplan
*Attorney, Agent, or Firm*—Robert R. Keegan; Head, Johnson & Kachigian

[57] ABSTRACT

There is disclosed a two-wire (series connectable) delay-on-release timer apparatus for air conditioner compressor motors or the like which is connectable in series in one side of the alternating current circuit with a low voltage alternating current source, a thermostat switch with a shunt resistor acting as an anticipator heater and a relay, or other control, for applying power from the power main to an air conditioner compressor or the like. The timer includes a full-wave rectifier circuit with output connected to an adjustable time delay digital timer and also connected to a gated thyristor whereby turning the thyristor on greatly reduces electrical impedance between the input terminals of the rectifier circuit. A digital timer IC is provided with circuit elements for sensing the difference between thermostat switch closed and thermostat switch open conditions. The digital timer IC is configured to start when the thermostat switch opens and after it times out and the thermostat switch closes, a signal is provided to trigger the thyristor and produce high conductance for the rectifier circuit to operate the relay and supply power from the power main to an air conditioning compressor or the like. Power failure also resets the timer so that turn on after a power failure is delayed for the time set by the particular timer.

17 Claims, 1 Drawing Sheet

COMPRESSOR MINIMUM OFF-TIME SWITCH FOR SERIES CONNECTION WITH DELAY-ON-BREAK FEATURE

BACKGROUND OF THE INVENTION

The present invention relates to control circuits for air conditioner compressor motors and other motors where it is very undesirable to reenergize a motor quickly after it has been deenergized. A principal use of such circuits is in connection with thermostatically controlled air conditioner units. In the absence of a delay circuit of the sort involved here, various circumstances could cause the air conditioner compressor motor to be energized soon after it was deenergized. One circumstance would be a manual or automatic adjustment of the thermostat to a lower temperature setting soon after it had turned the air conditioner off. Without an intervening delay device, there is a possibility that the air conditioner motor would be energized only a few seconds after it was deenergized. Although this possibility is not great, the deleterious effect should be avoided with virtual certainty.

In general, air conditioner timers for causing delay of reenergization of the compressor motor have been in widespread use for decades. Certain features of such devices make them more desirable; for example, it is convenient for a self-contained delay circuit to be installed by connecting only the two wires leading from the delay circuit in series with one side of a low voltage AC line from the thermostat to the air conditioner motor controller relay or similar device. In the past, most air conditioner timers required a source of power to operate the timer circuit other than the two wires which connected it in series in a line from the thermostat to the motor controller. Usually a third wire was provided which needed to be connected to the transformer or other low voltage source which provided current to the thermostat. Especially for replacement air conditioner delay timers, it is much more convenient if the repair or maintenance person can simply remove and/or shunt the old device and insert a new device by connecting its two wires into one side of the line from the thermostat to the air conditioner motor controller.

Another factor which influences the design of air conditioner delay timer devices is the undesirable effect of having to wait from one to five minutes for the air conditioner to start up on every occasion that the thermostat control produces a "make" or switch closed condition calling for air conditioning to be on. A delay timer which operates in this fashion is referred to as a delay-on-make timer. Other timers are available which commence a timing function when the break condition at the thermostat is detected, and, assuming there is not a too rapid reenergization by a "make" condition, the delay-on-break timer will time out, allowing reenergization of the air conditioner without delay. Still another factor is involved in that while the delay-on-break timer function is preferred for usual on-off operations, it is not desirable in the case of a general power failure. The reason for this is that one wishes to take advantage of the random differences in the delay time for a large number of air conditioners on one main power circuit as in a hotel or motel. The varied delays prevent the air conditioners all from turning on at once when the power is restored; if all or most of the air conditioners had delay-on-break timers and the power outage was sufficiently long then all air conditioners would turn on instantaneously when the power was restored, in most cases causing overload of a main circuit breaker. In a motel, for example, this would require most of the air conditioners to be physically turned off before the circuit breaker could be reset without being tripped by excessive current demand. It will therefore be seen that it is desirable, if not essential, that air conditioner delay timers have a delay-on-make operation whenever there has been a power failure.

In contrast to prior devices available, the present two-wire air conditioner timer with delay-on-break feature deals with each of these factors in a highly satisfactory manner, avoiding all of the difficulties mentioned above.

BRIEF SUMMARY OF THE INVENTION

According to the invention, simple and compact apparatus provides a two-wire air conditioner timer with delay-on-break feature, and provides a high degree of protection against damage to air conditioning equipment from rapid cycling off and on in whatever circumstance may be encountered. The apparatus requires relatively few components, and thus is inexpensive, in addition to which it is very compact and may be packaged in a cylinder less than one inch (1") in diameter and less than six inches (6") long. The timer, according to the invention, draws very little current for its sensing, timing and switching function, so that the normal thermostat-off current of a thermostat heater is more than adequate to power the timer circuitry. Not all air conditioner thermostats have a heater resistance in parallel with the switch for use as an anticipator heater, but it is a simple matter to supply a resistor of about 3000 ohms in parallel with the switch of the thermostat, if necessary. The timer, according to the invention uses the thermostat off-current for power, but at the same time, distinguishes between this low current level and the current of much higher value when the thermostat switch is closed in order to properly sense the closing of the thermostat switch (or the opening thereof). The circuit of the timer includes a full-wave rectifier implemented with four semiconductor diodes wherein the AC voltage provided to the rectifier is taken across a resistor or other impedance element connecting the first and second terminals of the timer. The two wires or terminals of the timer need not be identified as first and second terminals because the circuit is designed to receive alternating current which it then rectifies. Therefore the timer can be connected either of two ways; it is bidirectional.

The full-wave bridge circuit serves to supply DC power to the timer circuitry, but it also effectively shunts the impedance of the resistor between the first and second terminals of the timer when the output of the full-wave rectifier is effectively shunted by the very low "on" impedance of a thyristor. Thus, by utilizing the current leaking through the anticipator heater of the thermostat, the timer is powered even when the thermostat switch is off, so that it may be configured to time-out on the break or opening of the thermostat switch. Accordingly, the timer according to the invention, provides a delay-on-break feature which is quite desirable without a requirement for any connection to power other than that provided by the current passing through the thermostat, and only two wires or terminals are needed or provided for the timer circuit.

At the same time, it will be noted that the delay-on-break feature of the timer depends on power being supplied to the thermostat from the main system power supply. On resumption of power after a power failure, the timer will cause a delay before providing the on signal to the compressor power control.

The circuit therefore provides many desirable features in a two-wire air conditioner timer that were not all available in previous devices and does so with a simple trouble free circuit that is inexpensive to produce and compact and convenient to install. The timer is not limited to use with air conditioners or refrigerators and may find use in other systems where protection against too quick reenergization is needed.

In addition to providing the above features and advantages, it is an object of the present invention to provide a delay timer for electric motor circuits, particularly useful for control of air conditioner compressor motors which utilizes the leakage current or the off-current through a thermostat to power a digital counter configured as a timer and its associated circuitry.

It is another object of the present invention to provide a delay timer for air conditioner compressor motors or the like which does not require internal battery power or connection to an external power supply beyond that which is obtained by connecting its two terminals in series with one side of the line from the thermostatic control for the system.

It is still another object of the invention to provide such a two-wire delay timer for an air conditioner or the like wherein leakage current from the thermostat when the thermostatic switch is open is sufficient to power the timer element, allowing it to be configured as a delay-on-break delay control.

It is yet another object of the present invention to provide a two-wire air conditioner timer with a delay-on-break feature which is effective on opening of the thermostatic switch, but which requires the delay element to time out after a general power failure before closing the switch to energize the motor or other device being protected.

DESCRIPTION OF THE DRAWINGS

Other objects and advantages of the invention will be apparent from consideration of the follow description in conjunction with the appended drawings in which.

DETAILED DESCRIPTION

Figure 1:
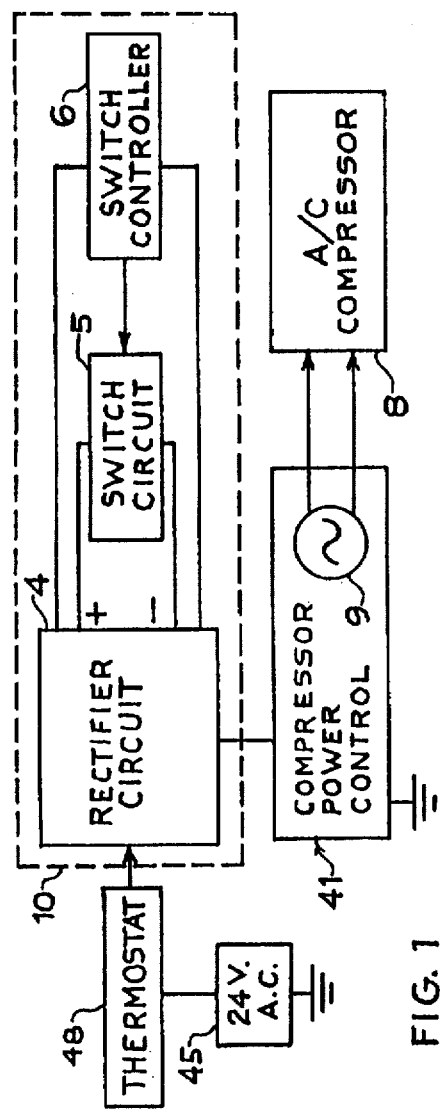
FIG. 1 is a schematic block diagram of a delay timer for air conditioners or the like and its connection into a conventional thermostatically controlled air conditioner system.

Referring to the drawings and particularly to FIG. 1, a delay timer 10 for an air conditioner or the like is shown in the dashed-line block. The main elements of the timer are a rectifier circuit 4, a switch circuit 5 and a switch controller 6. The rectifier circuit 4 is preferably a full wave rectifier having two AC input terminals and two output terminals, one of which is a positive DC terminal and the other is negative DC terminal.

Switch circuit 5 has input terminals connected respectively to the positive and negative output terminals of the rectifier circuit, and in the preferred embodiment, switch controller 6 is also connected to receive power from the plus terminal and minus terminal of the rectifier circuit. In an alternative version, the switch controller 6 could be provided with AC power.

The air conditioner compressor motor is schematically illustrated at 8, and is provided power from the main AC power source indicated at 9 under the control of the compressor power control 41. A low voltage AC power source 45, such as a 24 volt transformer is connected in a series circuit with a conventional thermostat 48, the delay timer 10 and the compressor power control 41. The details of the system shown in FIG. 1 are illustrated in a preferred embodiment shown in FIG. 2.

Figure 2:
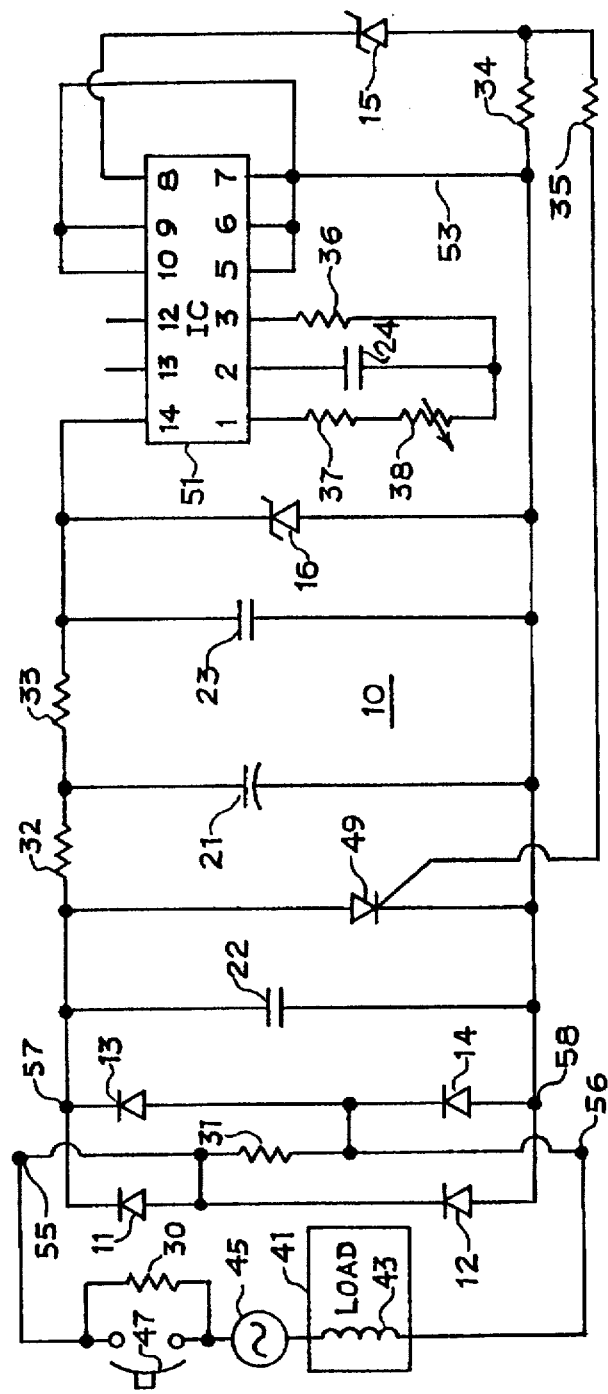
FIG. 2 is a schematic circuit diagram of a delay timer with delay-on-break feature according to the invention connected into a thermostatically operated air conditioner control system.

In FIG. 2 the low voltage AC power supply 45 is connected in series with the compressor power control 41 and with thermostat switch 47 which together with a parallel connected heater resistor 30 forms the essential elements of the air conditioner control for the thermostat 48.

Compressor power control 41 in FIG. 1 is shown to include a coil 43 representing the load powered by AC power source 45. Typically, coil 43 will be the coil of a power relay or equivalent device to cause the power mains to be connected or disconnected to air compressor motor 8, which is not shown in FIG. 2.

The series circuit supplied by low voltage AC power source 45 is completed through terminal 55 and a resistor 31 to terminal 56. Terminals 55 and 56 are the AC input terminals of a full wave rectifier formed by the bridge of four diodes 11, 12, 13 and 14. The DC output from the full wave rectifier appears at positive terminal 57 and negative terminal 58.

Resistor 31 may typically have a resistance of about 1,000 ohms and has the purpose of constantly maintaining at least a small current flow between terminals 55 and 56 so that there will also be current flow through resistor 30 which is a conventional anticipation heater resistor for the thermostat 48. The resistance of resistor 31 may range from 100 to 5,000 ohms as desired for compatibility in the system. It is very common for air conditioner thermostats to have a heater resistor 30 or the equivalent which heats the thermostat when switch 47 is open and does not heat the thermostat when switch 47 is closed. This has the effect of causing the thermostat to cool off more quickly when the switch 47 is closed and the air conditioner is running, thereby helping to prevent over-shoot of the temperature. The delay timer according to the present invention is designed to operate with a resistor 30 of typical form, having a resistance value of about 2,500–3,000 ohms. If the thermostat in the system does not have a resistor corresponding to 30 then it is a simple matter to connect a resistor of about 2,500–3,000 ohms in parallel with the thermostat; it need not be located where it performs the heating function of an anticipation heater resistor. Just as the current leakage through resistor 30 will be insufficient to operate the compressor power control 41 when the switch 47 is open, also the current through the series combination of resistors 30 and 31 will be even less and will not operate compressor power control 41 to energize the air conditioner compressor motor. As will later be seen, after the delay timer turns on, resistor 31 will no longer limit the current to compressor power control 41, because of the very low impedance path through the full wave rectifier circuit.

The low impedance path between terminals 55 and 58 when the delay timer has turned on is provided through a thyristor 49, which typically is a silicon controlled rectifier or SCR having its anode connected to terminal 57 and its cathode connected to terminal 58. Thyristor 49 may be any conventional semi-conductor switching element which is switched from a very high impedance in the off condition to a very low impedance in the on condition by a signal applied to its gate electrode.

The output from the rectifier bridge circuit at terminals 57 and 58 is a full wave rectified fluctuating DC voltage. Resistor 32 and 33 together with capacitors 21, 22 and 23 serve to filter and smooth time fluctuating output from terminals 57 and 58 in a generally conventional manner. However, it is an important consideration that certain resistance capacitance relations, particularly between capacitor 21 and resistor 32, give appropriate or proper control of the thyristor 49, which in the preferred embodiment is an SCR. Such SCR devices will stay on after being triggered by an appropriate current through their gate electrode so long as the anode to cathode current does not drop to zero or near zero. In the preferred embodiment, resistor 32 is selected to have a sufficiently low resistance and capacitor 21 is selected to have a sufficiently high capacitance to latch the SCR on through the fluctuating DC current cycle whenever thermostat switch 47 is closed, notwithstanding moderate variations in other parameters, such as the voltage from power supply 45. At the same time the resistance of resistor 32 is sufficiently high and the capacitance of capacitor 21 is sufficiently low to allow the SCR to de-latch should the thermostat switch 47 open reducing the circuit current to that flowing through anticipator-resistor 30.

Zener diode 16, which is a 16 volt diode, limits the voltage to the supply pin 14 of IC 51 while capacitor 23 further filters and smooths time voltage supplied to IC 51, which may be a digital timer type number 4541. Pins 1, 2 and 3 of the IC 51 are the oscillator section of the IC, allowing external control of the clock rate and hence control of the delay time. Resistors 37, 38 and 36 are connected in series from pin 1 to pin 3 and capacitor 24 is connected between the Junction of variable resistor 38 and resistor 36 to pin 2. Suitable resistance and capacitance values for these elements are shown in Table 1 below along with other element values and identification numbers.

The arrangement of capacitors and resistors connected to pins 1, 2 and 3 of IC 51 as shown in FIG. 2 allows the timer period to be adjusted from about 10 seconds to about 5 minutes by the adjustment of the resistance of variable resistor 38. In some cases it may be desirable to have a fixed time delay to avoid problems of misadjustment and this can be accomplished by using a resistor 37 of value 430,000 ohms, a capacitor 24 of value 0.01 microfarads and a resistor 36 of 2 megohms while eliminating the resistance of variable resistor 38 from the circuit by connecting resistor 36 direct to resistor 37. Delay times may range from 10 seconds to 10 minutes.

The circuit is designed so that the supply voltage to timer IC 51, when thermostat switch 47 is open, will be less than 12 volts; diode 15 is a 12 volt Zener diode preventing any effective output from pin 8 of IC 51 when switch 47 is open. Pins 9 and 10 of IC 51 determine mode of operation, pins 12 and 13 are for changing the number of counts of the internal counter, while pins 5, 6 and 7 are connected to the negative power supply through lead 53.

If the DC voltage at pin 14 of IC 51 is greater than 12 volts, and the output from pin 8 is high as a result of the counter counting out at the end of the predetermined timer period, then a gate signal is available through Zener diode 15 and a resistor 35 to the gate electrode of SCR-49. The Zener diode resistor 35 junction is connected to the negative output terminal 58 of the rectifier circuit by a resistor 34 which stabilizes the circuit while allowing a positive voltage to be applied to the gate of SCR-49.

The operation of the circuit of FIG. 2 may be explained as follows. When power is first applied to the circuit from AC power source 45, the timer will begin to time regardless of the position of thermostat switch 47, because anticipator-resistor 30 provides enough current for operation of the timer IC 51. Assume that switch 47 is open and it will be seen that resistance 31 is substantially less than the total of all the resistances in the series circuit by a factor of at least 3, so that only a small part of the voltage supplied by power source 45 will be available at the pin 14 input to IC 51. Accordingly, the voltage at pin 14 and hence any high voltage output at pin 8 is less than 12 volts. Thus when IC 51 times out and pin 8 goes high, diode 15 prevents the signal from firing SCR (which would reset the time delay). Resistor 34 prevents nuisance leakage currents from falsely firing the SCR. Pin 8 will then remain high due to the stand by mode of IC 51 so long as power is supplied from low voltage power supply 45 and switch 47 is open.

As soon as switch 42 closes, and if the timer has timed out as postulated above, supply voltage to IC 51 goes up to 16 volts and a high voltage on pin 8 will then exceed the voltage of zener diode 15, thereby passing current through diode 15 and resistor 35 to fire the SCR 49.

Firing of the SCR 49 causes the impedance across SCR 49 to drop to a very low value, and this is reflected as a very low impedance between terminals 55 and 56. It will be noted that with SCR 49 "on" there is a low resistance path between terminal 55 and terminal 56 represented by only the small forward resistances of diodes 11–14 and SCR 49. With the current no longer impeded by resistor 31, the compressor power control 41 will be energized and will connect power to AC compressor 8.

With SCR 49 "on", time supply voltage to timer IC 51 drops to near zero causing the timer to reset the delay. Although output is no longer provided by pin 8, it is a characteristic of a thyristor such as SCR 49 to remain on as long as there is at least a low holding current from the anode to cathode of the SCR. In this situation there is a substantial fluctuating current of rectified AC pulses through SCR 49 and capacitor 21 and resistor 32 provide voltage and current to the SCR to maintain it on by preventing the current from going to zero between pulses of the pulsating DC current. As explained above, the relative values of resistor 32 and capacitor 21 are particularly selected to that switch 47 must be closed to maintain adequate holding current through SCR 49. This does not present a problem, and the relative values shown in Table I below provide reliable operation in this respect.

TABLE I

| COMPONENT | VALUE | RATING |
|---|---|---|
| RESISTORS | OHMS | |
| 30 | 2.2K to 3.3K | 1/4 W, 5% |
| 31 | 1.0K | 1.0 W |
| 32 | 100 | 1/4 W |
| 33 | 4.7K | 1/4 W |
| 34 | 4.7K | 1/4 W |
| 35 | 4.7K | 1/4 W |
| 36 | 3M | 1/4 W |
| 37 | 56K | 1/4 W |
| 38 | 2M | 1/4 W |
| CAPACITORS | MICROFARADS | |
| 21 | 4.7 | 50 V. |
| 22 | .01 | 50 V. |
| 23 | .01 | 50 V. |
| 24 | .0022 | 50 V. |
| DIODES | | |
| 11–14 | 1N4007 | 1A, 1000 V |
| 15 | 12 V | 1/2 W |
| 16 | 16 V | 1/2 W |

TABLE I-continued

| COMPONENT | VALUE | RATING |
| --- | --- | --- |
| TRANSISTOR & IC | | |
| 49 | C106D | |
| 51 | 4541 | |

A preferred embodiment of the invention illustrated and described above is subject to variation and modification to adapt it to different uses. As previously described, the variable time delay feature implemented by variable resistor 38, may be eliminated and the time delay may be set to be fixed at about 5 minutes or some other desired time period. The values for the electrical components in the system may be changed for purposes of economy or other purposes in accordance with well known circuit design principles. Integrated circuit 51 may be selected with different characteristics than those in the illustrated embodiment in addition to which the SCR 49 may be replaced with another form of thyristor or equivalent electronic switching device. If other forms of loads are to be protected, appropriate changes in values of voltage, resistors or current may be determined in accordance with conventional circuit design techniques.

In addition to the variations and modifications to the illustrated circuit which have been described or suggested above, other variations or modifications will be apparent to those of skill in the art, and accordingly the scope of the invention is not to be considered limited to the particular embodiments described or suggested, but is rather to be determined by reference to the appended claims.

What is claimed is:

1. Compressor minimum off-time switch apparatus for series connection in one side of the electrical connection from a thermostat to an air conditioner compressor actuator circuit with delay-on-break feature having no battery supplemental power source comprising:

a) a full-wave rectifier circuit having a first input terminal, a second input terminal, a first output terminal, and a second output terminal, said first input terminal and said second input terminal serving as terminals for series connection of said switch apparatus in one side of said electrical connection from a thermostat to an air conditioner compressor actuator circuit, b) an electrical resistor of from 100 to 5000 ohms connected between said first input terminal and said second input terminal, c) a thyristor with an anode and a cathode connected to pass current from said first to said second output terminal, said thyristor having a gate electrode for switching said thyristor "on" with a high conductivity in response to a control signal applied to said gate electrode, d) a control circuit connected to said full wave rectifier circuit and to be responsive to an electrical potential between said first input terminal and said second input terminal, said control circuit including means for generating a control signal with a predetermined time delay relative to changes of said electrical potential, said full-wave rectifier circuit supplying sufficient current to said control circuit through said first output terminal and said second output terminal as necessary to eliminate the need for a battery power source, e) an electrical connection for applying said control signal to said gate electrode, and f) means for providing holding current to said thyristor to maintain it in "on" condition, whereby a high electrical potential produced by high current through said resistor will cause said thyristor to be gated on only if there has been a previous time delay of predetermined length following a drop in said electrical potential to cause said control circuit to transmit a control signal to said gate electrode.

2. Apparatus as recited in claim 1 wherein said control circuit comprises a timer for producing an output signal from about ten seconds to about ten minutes after responding to a change in electrical potential at the timer input.

3. Apparatus as recited in claim 2 wherein the time delay period of said timer is manually adjustable.

4. Apparatus as recited in claim 1 wherein said means for providing holding current further includes a capacitor for preventing turn-off of said thyristor at zero crossings of the electrical potential at said first and second input terminals.

5. Apparatus as recited in claim 4 wherein the power supplied to said control circuit is rectified by said rectifier and further including means for filtering the power from said rectifier to reduce its AC component.

6. Apparatus as recited in claim 1 wherein the power supplied to said control circuit is rectified by said rectifier and further including means for filtering the power from said rectifier to reduce its AC component.

7. A series connectable electric signal-responsive alternating current switch apparatus for connection in one side of an electrical circuit to an alternating current utilization device comprising:

a) a full-wave rectifier circuit having a first input terminal, a second input terminal, a first output terminal, and a second output terminal, said first input terminal and said second input terminal serving as terminals for series connection of said switch apparatus in one side of said electrical circuit to said alternating current utilization device, b) an electrical impedance device connected between said first input terminal and said second input terminal, c) a thyristor with an anode and a cathode connected to pass current from said first to said second output terminal, said thyristor having a control electrode for switching it from a low conductivity to a high conductivity in response to a signal applied to said control electrode, d) a control circuit connected to receive power solely from said full-wave rectifier circuit and to be responsive to an electrical potential between said first input terminal and said second input terminal, said control circuit including means for generating a control signal as a predetermined function of said electrical potential, said full-wave rectifier circuit supplying sufficient current to said control circuit through said first output terminal and said second output terminal as necessary to eliminate the need for a battery power source, and e) means for applying said control signal to said control electrode.

8. Apparatus as recited in claim 7 wherein said control circuit comprises a timer for producing an output signal from about ten seconds to about ten minutes after responding to a change in electrical potential at the timer input.

9. Apparatus as recited in claim 7 further including means for preventing turn-off of said thyristor at zero crossings of the electrical potential at said first and second input terminals.

10. Apparatus as recited in claim 9 wherein said thyristor is a silicon controlled rectifier with a single control electrode.

11. Apparatus as recited in claim 7 wherein said thyristor is a silicon controlled rectifier with a single control electrode.

12. Apparatus as recited in claim 11 wherein the power supplied to said control circuit is rectified by said rectifier and further including means for filtering the power from said rectifier to reduce its AC component.

13. Apparatus as recited in claim 7 wherein the power supplied to said control circuit is rectified by said rectifier and further including means for filtering the power from said rectifier to reduce its AC component.

14. Compressor minimum off-time switch apparatus having no battery supplemental power source and only two external wires or terminals for series connection with a thermostat, a contactor, and a low voltage alternating current power supply therefor in an air conditioning system comprising:

a housing with only two external wires;

a full wave rectifier having a first input terminal connected to the first of said only two external wires and a second input terminal connected to the second of said only two external wires;

an electrical impedance of from 100 to 5,000 ohms connected between said first input terminal and said second input terminal;

said full wave rectifier having a first output terminal and a second output terminal, a semiconductor switch element connected therebetween;

circuit means including a timer and connected to be powered solely from said first output terminal and said second output terminal for causing a delay on operating action for said semiconductor switch element in the event of a power interruption, but in the event of a thermostat interruption causing only a delay on release action for said semiconductor switch element, said full-wave rectifier circuit supplying sufficient current to said control circuit through said first output terminal and said second output terminal as necessary to eliminate the need for a battery power source.

15. Apparatus as recited in claim 14 wherein said timer is capable of producing an output signal from about ten seconds to about ten minutes after responding to a change in electrical potential at the timer input.

16. Apparatus as recited in claim 14 wherein said semiconductor switch element is a silicon controlled rectifier with a single control electrode.

17. Apparatus as recited in claim 14 wherein said timer is a binary digital pulse counting integrated circuit timer.

* * * * *

UNITED STATES PATENT AND TRADEMARK OFFICE
CERTIFICATE OF CORRECTION

PATENT NO. : 5,627,417
DATED : May 6, 1997
INVENTOR(S) : Roger CLARKE

It is certified that error appears in the above-indentified patent and that said Letters Patent is hereby corrected as shown below:

Column 5, line 23, delete "time" and substitute --the-- therefor;

Column 5, line 29, delete "Junction" and substitute --junction-- therefor;

Column 6, line 14, delete "42" and substitute --47-- therefor; and

Column 6, line 29, delete "time" and substitute --the-- therefor.

Signed and Sealed this

Nineteenth Day of August, 1997

Attest:

BRUCE LEHMAN

Attesting Officer

Commissioner of Patents and Trademarks